Dec. 22, 1970

HIROSHI TAKEMURA ET AL  3,549,973

SINGLE-PHASE COMMUTATOR MOTOR SPEED CONTROLLING DEVICE

Filed July 27, 1967  2 Sheets-Sheet 1

United States Patent Office 3,549,973
Patented Dec. 22, 1970

3,549,973
SINGLE-PHASE COMMUTATOR MOTOR SPEED CONTROLLING DEVICE
Hiroshi Takemura, Osaka, Fumio Nomura and Norimasa Kondo, Hirakata-shi, Hiromichi Yamamoto, Daito-shi, and Akira Isawa, Moriguchi-shi, Japan, assignors to Matsushita Electric Industrial Co., Ltd., Osaka, Japan, a corporation of Japan
Filed July 27, 1967, Ser. No. 656,374
Claims priority, application Japan, Aug. 2, 1966, 41/74,140
Int. Cl. H02p 5/16; H01c 9/08
U.S. Cl. 318—345        4 Claims

ABSTRACT OF THE DISCLOSURE

This specification discloses a device for controlling the speed of rotation of a single phase commutator motor used as the motor for a sewing machine or the like, wherein a silicon controlled rectifier element (hereinafter referred to as "S.C.R.") is connected in series with the circuit of said single phase commutator motor and the speed of rotation of the latter is controlled by controlling the conduction angle of said S.C.R.

BACKGROUND OF INVENTION

This invention relates to a single phase commutator motor, and more particularly to a device for controlling the speed of rotation of such motor.

There has heretofore been known a device which is capable of changing over the speed of a single phase commutator motor into two maximum speeds to freely control the speed of the motor in the lower speed range. The control of the speed in the lower speed range was effected by utilizing the variation characteristic of the resistance value of a variable resistor. However, the variation characteristic of the resistance value was made such that it changes linearly with respect to the distance over which the movable terminal of the variable resistor moves, and therefore, in the lower speed range, even if the distance of movement of said movable terminal was small, the resistance value of the variable resistor changed in proportion to said distance of movement and the number of rotations of the single phase commutator motor changed greatly. This led to a disadvantage that it was difficult to stably control the number of rotations of the motor in the lower speed range and a special technique was necessarily required. Furthermore, in order to change the resistance value of the variable resistor and gradually increase the number of rotations of the motor to obtain a first maximum speed and thereafter a second maximum speed, it was necessary to separately operate a speed change-over switch provided separately. This doubled the trouble of operation in that not only the adjustment of the variable resistor but also the switching of the speed change-over switch must be effected in operation.

SUMMARY OF INVENTION

It is therefore an object of the present invention to make the speed controlling device of a single phase commutator motor smaller in size and lighter in weight as well as easy to effect the control operation through arranging an S.C.R. and circuit elements for controlling the conduction angle of said S.C.R. all together on a printed board which is accommodated within a case having a foot-board.

It is another object of the present invention to enable the speed of rotation of a single phase commutator motor to be smoothly increased from a lower speed to the maximum speed and smoothly controlled through the provision of a circuit capable of short-circuiting the anode terminal and cathode terminal of an S.C.R., and a short circuiting switch provided in said circuit and interlocking with the movable terminal of a variable resistor controlling the conduction angle of said S.C.R. so as to be closed when the conduction angle of the S.C.R. is maximum.

It is still another object of the present invention to enable the maximum speed of rotation of the single phase commutator motor to be changed over into two stages through bending one contact of said short-circuiting switch by means of an operatng knob and changing over the switching position of the contact of the short-circuiting switch.

It is still another object of the present invention to readily and stably effect the speed control in the lower speed range through making the characteristic of the variable resistor controlling the conduction angle of the S.C.R., namely the characteristic of the resistance value from the reference point of the movable terminal of said variable resistor to the variable terminal with respect to the amount of displacement of said movable terminal from said reference point, into the parabolic characteristic or the logarithmic characteristic.

It is yet another object of the present invention to enable the speed control of a single phase commutator motor to be stably effected and greatly facilitate such control operation by providing on a single printed board all of an S.C.R. connected in series with the single phase commutator motor, a conduction angle control circuit comprising a variable resistor for controlling the conduction angle of said S.C.R., a stabilizing circuit for stabilizing the gate voltage of said S.C.R., and a short-circuiting switch for short-circuiting a power source switch and said S.C.R.

These and other objects and advantages of the present invention will be apparent from the following detailed description made with reference to the accompanying drawings showing an embodiment thereof.

DETAILED EXPLANATION OF INVENTION (EXPLANATION OF EMBODIMENTS)

Figure 1:
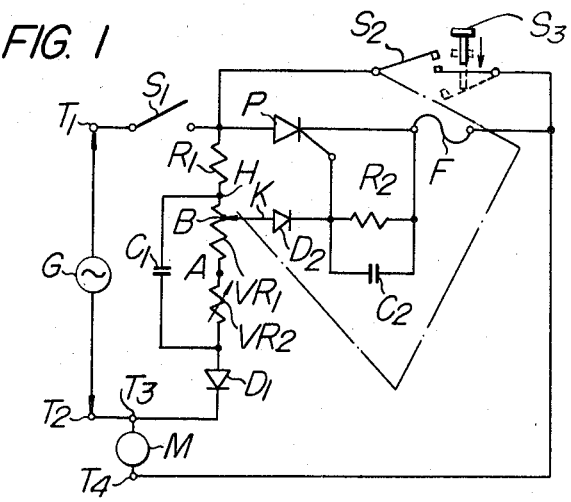
FIG. 1 shows an electric connection diagram of the speed controlling device of a single phase commutator motor according to an embodiment of the present invention.

Referring now to FIG. 1, there is shown an A.C. power source G having power source terminals $T_1$ and $T_2$. A single phase commutator motor M having a series field coil is connected between terminals $T_3$ and $T_4$. One of these terminals, that is, $T_3$ is connected with the power source terminal $T_2$. The letter P represents an S.C.R. having the cathode terminal thereof connected with the other terminal $T_4$ through a fuse F and the anode terminal thereof connected with the power source terminal $T_1$ through a power source switch $S_1$. A resistor $R_1$ has one end thereof connected with the anode terminal of S.C.R. P and the other end connected with a series connection of variable resistors $VR_1$ and $VR_2$ and a diode $D_1$ connected in this order. The other end of said diode $D_1$ is connected with the terminal $T_3$. A capacitor $C_1$ is connected in parallel with a branch consisting of a series connection of variable resistors $VR_1$ and $VR_2$. A diode $D_2$ is connected between the movable terminal K of the variable resistor $VR_1$ and the gate terminal of S.C.R. P. Said diode $D_2$ is connected in the forward direction from the movable terminal K toward the gage terminal of S.C.R. P. A resistor $R_2$ and a capacitor $C_2$ are connected in parallel with each other between the gate terminal and the cathode terminal of S.C.R. P. There are a switch $S_2$ and a switch $S_3$, the former being a short-circuiting switch interlocking with the movement of the movable terminal K and closing when the movable terminal K reaches one end H of the variable resistor $VR_1$, and the latter being a speed change-over mechanism which can be manually opened and closed as desired. This latter switch $S_3$ is shown as being connected in series with the short-circuiting switch $S_2$ in FIG. 1. In mechanism, however, the speed change-over switch causes one of the contacts of short-circuiting switch $S_2$ to be bent so that the switch $S_2$ does not close even when the movable terminal K has reached said one end H of the variable resistor $VR_1$. A branch formed by a series connection of the short-circuiting switch $S_2$ and the speed change-over switch $S_3$ is connected in parallel with a branch formed by a series connection of S.C.R. P and the fuse F.

Figure 5:
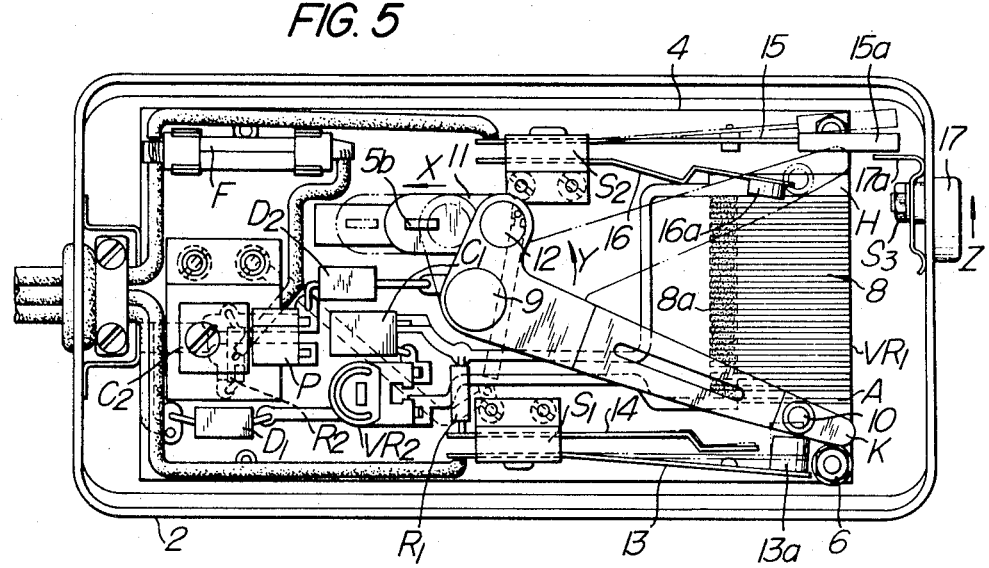
FIG. 5 is a bottom plane view of said speed controlling device with the bottom plate removed.
Figure 6:
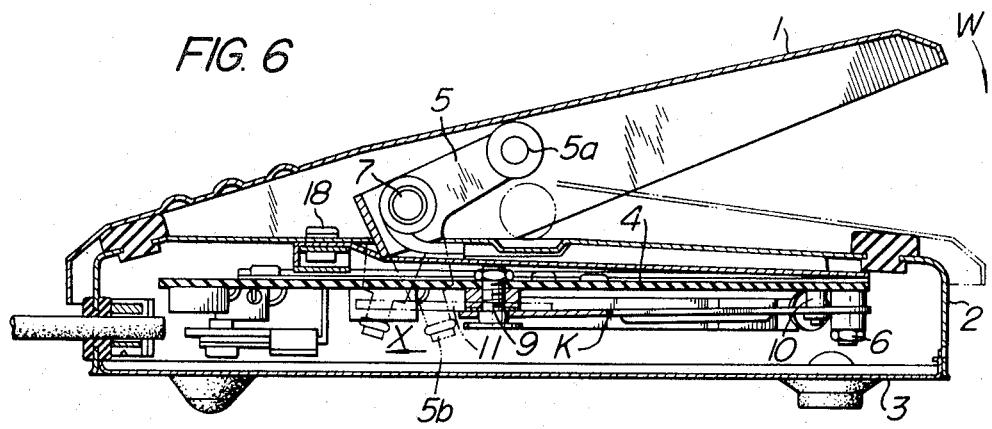
FIG. 6 is a longitudinal sectional view of said speed controlling device.

In FIGS. 5 and 6, there is seen a foot-board 1 mounted for pivotal movement in the direction of arrow W with respect to a case 2. This foot-board is energized in the opposite direction to that shown by the arrow W during non-operation. A bottom plate 3 is mounted on the bottom of the case 2 to cover the latter, and a printed board 4 of the electric circuit is mounted within said case 2 by means of a nut 6 and a screw 18. A crank 5 is mounted for pivotal movement about a shaft 7 secured to the case 2. One end 5a of said crank 5 is in contact with the back surface of the foot-board 1 and the other end 5b of said crank 5 is projected into the interior of the case 2 to extend through the printed board 4. On the printed board 4 are disposed electric circuit element connected together such as said power source switch $S_1$, short-circuiting $S_2$, S.C.R. P, fuse F, variable resistors $VR_1$ and $VR_2$, diodes $D_1$ and $D_2$, capacitors $C_1$ and $C_2$, and resistors $R_1$ and $R_2$. The resistance film 8a and tap 8 of the variable resistor $VR_1$ are provided in close contact with the surface of the printed board 4. The movable terminal K of the variable resistor $VR_1$ is supported in such a manner that it can be pivotally moved about a supporting shaft 9 fixed to the printed board 4 in the direction shown by arrow Y, and it is energized in the opposite direction to the arrow Y. A brush 10 sliding on the tap 8 of the variable resistor $VR_1$ is attached to the fore end of the movable terminal K, and a connecting Bakelite plate 11 is connected with the other end of the movable terminal K by means of a pin 12. The connecting plate 11 is also connected with the end 5b of said crank 5. The numeral 13 shows the contact plate of the power source switch $S_1$ and the numeral 14 denotes the fixed contact plate of the switch $S_1$. The power source switch $S_1$ is in the "OFF" position when an insulator 13a provided in the fore end of said movable contact plate 13 is engaged with the movable terminal K, while the power source switch $S_1$ assumes the "ON" position when the movable contact K is pivotally moved in the direction of arrow Y to disengage the insulator 13a provided on the fore end of the movable contact plate 13 from the movable terminal K. The short-circuiting switch $S_2$ has a fixed contact plate 15 and a movable contact plate 16. This short-circuiting switch $S_2$ normally assumes the "OFF" position, but it assumes the "ON" position when the movable contact K is pivotally moved in the direction shown by arrow Y to press an insulator 16a provided on the fore end of said movable contact plate 16. A speed change-over mechanism $S_3$ has an operating knob 17 mounted on the side wall of the case 2 so as to be movable in the direction shown by arrow Z. The fore end 17a of the knob 17 engages an insulator 15a provided on the fore end of the fixed contact plate 15. Thus, when the operating knob 17 is moved in the direction as shown by arrow Z, the insulator 15a provided on the fore end of the fixed contact plate 15 is pressed by the fore end 17a of the operating knob 17 into a position as shown by a dots-and-dash chain line in FIG. 5. As a result, even when the movable terminal K is rotated in the direction shown by arrow Y into a position shown by another dots-and-dash chain line so as to press the movable contact plate 16, this movable contact plate 16 does not engage the fixed contact plate 15 and consequently the short-circuiting switch $S_2$ does not assume the "ON" position. The relation between the short-circuiting switch $S_2$ and the speed change-over mechanism $S_3$ is electrically represented as two separate switches as shown in FIG. 1, while in mechanism the speed change-over mechanism $S_3$ may be a switch which limits the switching action of the short-circuiting switch $S_2$. The mechanical switch $S_3$ shown in FIG. 1 may be solenoid operated if desired. Depression of the foot-board 1 in the direction of the arrow W causes the crank 5 to be rotated in the same direction as the arrow W and the connecting plate 11 to be moved in the direction shown by arrow X in FIG. 5, which in turn rotates the movable terminal K in the direction of arrow Y, thus changing the resistance value of the variable resistor $VR_1$. When this state is considered with reference to the circuit diagram of FIG. 1, it is seen that the depression of the foot-board 1 in the direction of arrow W causes the movable terminal K to be moved on the variable resistor $VR_1$ from point A toward point H. If the pressure exerted on the foot-board 1 is released, the foot-board 1, crank 5, connecting plate 11 and movable terminal K will return to their respective original positions as shown in FIGS. 5 and 6.

At this time the power source terminals $T_1$ and $T_2$ are connected with the A.C. power source G and the foot-board is slightly depressed. As a result the movable terminal K is somewhat rotated in the direction of the arrow Y to engage the movable contact plate 13 with the fixed contact plate 14 so as to turn on the power source switch $S_1$, whereby a current is flowed into the single phase commutator motor M through S.C.R. P and fuse F to rotate motor M. The depression of the foot-board 1 is adjusted to cause the movable terminal K of the variable resistor $VR_1$ to slide and thereby the conduction angle $\theta$ of S.C.R. P is varied to enable the number of rotations of the single phase commutator motor M to be controlled. The circuit comprising the resistor $R_1$, variable resistors $VR_1$ and $VR_2$ and capacitor $C_1$ is a gate circuit for producing a reference voltage which ignites S.C.R. P when the residual counter electromotive force of the single phase commutator motor M assumes a predetermined value. As the movable terminal K of the variable resistor $VR_1$ is moved from point A toward point H, the conduction angle $\theta$ of S.C.R. P is gradually increased to raise the speed of the single phase commutator motor M, and the conduction angle $\theta$ of S.C.R. P reaches a maximum value when the movable terminal K of the variable resistor $VR_1$ reaches point H. At this time the speed of the single phase commutator motor M reaches $N_2$. When at the same time the operating knob 17 of the change-over mechanism $S_3$ is moved in the direction of arrow Z to bring the fixed contact plate 15 into the position shown by the dots-and-dash chain line, the short-circuiting switch $S_2$ remains open irrespective of the fact that the movable terminal K is moved to point H, and therefore the speed of the single phase commutator motor M does not increase any further. Diodes $D_1$ and $D_2$ serve to protect the voltage between the gate and cathode of S.C.R. P so that the voltage at the gate side does not go negative. The circuit comprising the capacitor $C_2$ and resistor $R_2$ serves to stabilize the gate voltage of S.C.R. P.

Figure 2:
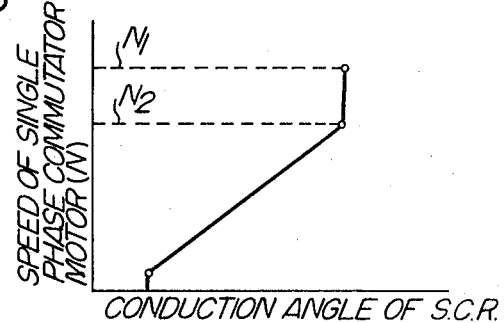
FIG. 2 is a graph illustrating the characteristic curve representing the relation between the conduction angle of the S.C.R. used with said speed controlling device and the speed of rotation of the single phase commutator motor.

If it is desired to increase the speed of the single phase commutator M to $N_1$, the short-circuiting switch $S_2$ may be set so as to close without previously moving the operating knob 17 of the speed change-over mechanism $S_3$ in the direction of arrow Z. In this state, when the movable terminal K of the variable resistor $VR_1$ is gradually moved from point A toward point H, the speed of the single phase commutator motor M is gradually increased as described above and shown in FIG. 2, and when the movable terminal K reaches point H of the variable resistor $VR_1$ and the conduction angle $\theta$ of S.C.R. P reaches a maximum value, the short-circuiting switch $S_2$ closes. (In the circuit diagram as shown in FIG. 1, both the short-circuiting switch $S_2$ and the speed change-over mechanism $S_3$ assume the closed position.) Therefore the anode and cathode terminals of S.C.R. P are short-circuited, with a result that the entire voltage of the A.C. power source G is applied to the single phase commutator motor M, the speed of which in turn jumps from $N_2$ to $N_1$ and the motor M rotates at the high speed $N_1$.

In the past, as a device for changing over the speed of the single phase commutator motor M into two maximum speeds $N_1$ and $N_2$ and freely controlling the speed in the lower speed range, there was one having a circuit arrangement similar to the FIG. 1 embodiment but without the short-circuiting switch $S_2$. In such a conventional device there was no problem in obtaining the lower speed $N_2$, whereas in order to obtain the highest speed $N_1$ it was necessary to adjust the movable terminal K of the variable resistor $VR_1$ in the same manner as described above so as to gradually increase the speed of the single phase commutator motor M, and thereafter close the speed change-over mechanism $S_3$ through a separate operation so that the highest speed $N_1$ was reached. For this reason the operation was more troublesome in that during the adjustment of the variable resistor $VR_1$ a separate procedure of closing the speed change-over mechanism $S_3$ was additionally required.

In contrast, in the speed controlling device of the single phase commutator motor according to the present invention, a single phase commutator motor M and an S.C.R. P are connected in series with an A.C. power source G, a short-circuiting switch $S_2$ is provided which interlocks with the conduction angle controlling portion for the S.C.R. P and closes when the conduction angle is maximum, a speed change-over mechanism $S_3$ which can be manually switched as desired is connected in series with said short-circuiting switch $S_2$, and this series circuit is connected between the anode and cathode terminals of said S.C.R. P. Thus, the speed change-over mechanism $S_3$ which can be manually actuated as desired is previously opened or closed as required, whereby the maximum speed of the single phase commutator motor M can simply be changed into two speeds, either of which may be obtained by operating the conduction angle controlling portion for the S.C.R. P in the same way. This tells that the speed control operation is very simple and easy.

Also, in the speed controlling device according to the present invention, the electric circuit elements such as resistors $R_1$ and $R_2$, variable resistors $VR_1$ and $VR_2$, capacitors $C_1$ and $C_2$, diodes $D_1$ and $D_2$ and fuse F are disposed all together on a printed board 4, which is accommodated within a case 2. This makes the device compact and light in weight. Moreover, the brush 10 of the movable terminal K of the variable resistor $VR_1$ for controlling the speed does not slide on the resistance film $8a$ but slides on the top 8 so that the resistance film $8a$ of the variable resistor $VR_1$ is protected from wearing.

Furthermore, in the speed controlling device according to the present invention, the movable terminal K of the variable resistor $VR_1$ slides on the resistance film $8a$ on the printed board 4 by means of the crank 5 moved by the depression of the foot-board 1, and the power source switch $S_1$ mounted on the printed board 4 is switched on at the initiation of the depression of the foot-board 1 while the short-circuiting switch $S_2$ provided on the printed board 4 is closed at the termination of the depressions of the foot-board 1, whereby the entire A.C. voltage is applied to the single phase commutator motor M in order to rotate it at a high speed. The speed of the single phase commutator motor M can be readily controlled from the start to the two maximum speeds simply through a series of operation of the foot-board 1.

Description will now be made of the variable resistor $VR_1$ in particular. The characteristic of the resistance value R between the points A and H of the variable resistor $VR_1$ with respect to the distance of movement of the movable terminal K thereof, namely the distance Q between point A and H (or, in the case where the movable terminal K is rotated, the angle of rotation), is set to represent the parabolic characteristic or a logarithmic characteristic as shown by the curve $\alpha$ in FIG. 3, and as a result the characteristic of the number of rotations N of the motor with respect to the distance of movement of the movable terminal K shows a linear or somewhat parabolic characteristic as represented by the solid line of FIG. 4.

Figure 3:
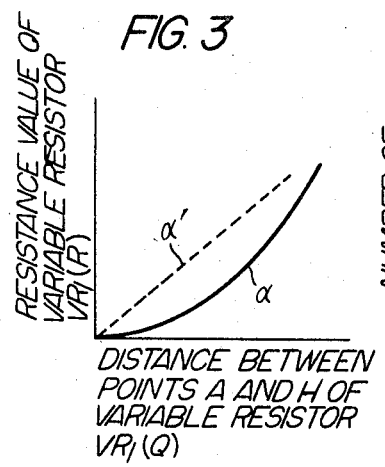
FIG. 3 is a graph illustrating the characteristic of the variable resistor used with said speed controlling device.
Figure 4:
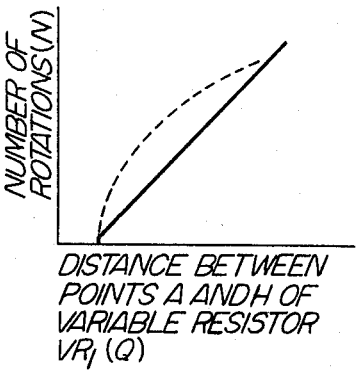
FIG. 4 is a graph showing the characteristic curve representing the relation between the variable resistor and the speed of rotation of the single phase commutator motor.

Generally in the speed controlling variable resistor used in this type of speed controlling device, the characteristic of the resistance value R from the reference point to the movable terminal with respect to the distance of movement Q of the terminal from the reference point thereof is linear as shown by the broken line $\alpha$ in FIG. 3. In case such a variable resistor is used as the speed controlling variable resistor, the characteristic of the number of rotations N with respect to the distance of movement Q of the movable terminal is such as shown by the broken line in FIG. 4, and this causes a disadvantage that in the lower speed range the variation in the number of rotations becomes greater even if the distance of movement Q of the movable terminal is small and accordingly the stable control of the number of rotations in the lower speed range is so difficult as to require a specific skill.

In the speed controlling device of the present invention, however, the characteristic of the resistance value from the reference point of the movable terminal K of the speed controlling variable resistor $VR_1$ to the movable terminal K with respect to the amount of displacement of the movable terminal K from said reference point is set to represent the parabolic characteristic or the logarithmic characteristic, and therefore the characteristic of the number of rotations with respect to the amount of displacement of the movable terminal K becomes a linear or somewhat parabolic characteristic. As a result the variation in the number of rotations with respect to the variation in the amount of displacement of the movable terminal K is also small in the lower speed range and consequently the speed control in the lower speed range is stabilized to facilitate the speed control operation.

As to the variable resistor $VR_2$, this variable resistor serves to compensate so that the voltage between the gate and cathode of S.C.R. P is in the vicinity of the minimum igniting voltage immediately after the power source switch $S_1$ is closed, and also serves to correct the irregularities of the gate characteristic of S.C.R. P. The capacity of the capacitor $C_2$ is great, and the parallel circuit of the resistor $R_2$ and capacitor $C_2$ serves to absorb any abnormal voltage between the gate and cathode of S.C.R. P. Thus, the variable resistor $VR_2$ adjusts and determines the minimum controllable number of rotations of the single phase commutator motor M, while the resistor $R_2$ stabilizes the control load characteristic, namely regulation, of the single phase commutator motor M.

In the speed controlling device of the present invention, the minimum controllable number of rotations of the single phase commutator motor is determined by adjusting the variable resistor $VR_2$ to thereby correct the irregularity of the gate characteristic of S.C.R. P. Furthermore, the resistor $R_2$ connected between the gate terminal and cathode terminal of S.C.R. enables the stabilization of the control load characteristic of the single phase commutator motor. Furthermore, the capacitor $C_2$ of great capacity connected in parallel with said resistor $R_2$ prevents any abnormal gate current from being produced due to the abnormal voltage caused by the reactance voltage or the like of the single phase commutator motor M, and any abnormal surge current is passed through this capacitor $C_2$ to thereby highly stabilize the operation of the entire speed controlling circuit.

In addition, there flows a heavy current through the single phase commutator motor M and S.C.R. P when the motor M is in a constrained state or in a heavy-load state.

For a short time the S.C.R. P can withstand a relatively heavy current, but it will be damaged if a heavy current above the allowable value flows continuously. In the speed controlling device according to the present invention, however, the fuse F for cutting off any abnormal current in the forward direction of S.C.R. P is connected in series with the series circuit of the single phase commutator motor M and S.C.R. P, so that the fuse F is fused to protect S.C.R. P if the single phase commutator motor M is in a constrained state or in a heavy-load state to flow an abnormal heavy-load current. Therefore, instead of an S.C.R. having an ample current capacity, use can be made of an S.C.R. P having a sufficient current capacity to withstand the current in the rated overall load state so as to construct the device economically.

While the present invention has been described and shown with respect to one embodiment thereof, it should be understood that the scope of the invention is only restricted by the appended claims.

What is claimed is:

1. A speed controlling device of a single phase commutator motor, comprising a printed board (4) having an electric wiring pattern printed thereon, a variable resistor ($VR_1$) formed on said printed board (4), said variable resistor ($VR_1$) including a tap (8) printed on said printed board (4), a resistance film (8a) in contact with the end of said tap and a movable terminal (K) sliding on said tap (8), a semiconductor controlled rectifier element (P) mounted on said printed board (4) and electrically connected in series with a single phase commutator motor (M), said element (P) having its conduction angle varied with the variation in the resistance value of said variable resistor, and circuit elements associated with said semiconductor controlled rectifier element (P) and mounted on said printed board (4), said printed board (4) being accommodated in a case (2) to which is attached a foot-board (1) connected with said movable terminal (K) to move the latter, said circuit elements associated with said semiconductor controlled rectifier element (P) including a short-circuiting switch ($S_2$) adapted for interlocking with said movable terminal (K) of said variable resistor ($VR_1$), and for closing when the conduction angle of said semiconductor controlled element (P) reaches a maximum and being capable of short-circuiting the anode and cathode of said semiconductor controlled rectifier element (P), and a speed change-over mechanism ($S_3$) restraining said short-circuiting switch ($S_2$) from being closed, said speed change-over mechanism ($S_3$) having an operating knob (17) mounted on said case (2), said operating knob (17) being capable of bending the fixed contact plate (15) of said short-circuiting switch ($S_2$) into a position where it is not engaged by the movable contact plate (16) of said short-circuiting switch ($S_2$) through the movement of said movable terminal.

2. A speed controlling device of a single phase commutator motor, comprising a printed board having an electric wiring pattern printed thereon, a variable resistor formed on said printed board, said variable resistor including a tap printed on said printed board, a resistance film in contact with the end of said tap and a movable terminal sliding on said tap, wherein the characteristic of the resistance value from the reference point of the movable terminal of the variable resistor to said movable terminal with respect to the amount of displacement of said movable terminal from said reference point represents a parabolic characteristic, a semiconductor controlled rectifier element mounted on said printed board and electrically connected in series with a single phase commutator motor, said rectifier element having its conduction angle varied with the variation in the resistance value of said variable resistor, and circuit elements associated with said rectifier element and mounted on said printed board, said printed board being accommodated in a case to which is attached a foot-board connected with said movable terminal to move the latter.

3. A speed controlling device of a single phase commutator motor, comprising a printed board having an electric wiring pattern printed thereon, a variable resistor formed on said printed board, said variable resistor including a tap printed on said printed board, a resistance film in contact with the end of said tap and a movable terminal sliding on said tap, wherein the characteristic of the resistance value from the reference point of the movable terminal of the variable resistor to said movable terminal with respect to the amount of displacement of said movable terminal from said reference point represents a logarithmic characteristic, a semi-conductor controlled rectifier element mounted on said printed board and electrically connected in series with a single phase commutator motor, said rectifier element having its conduction angle varied with the variation in the resistance value of said variable resistor, and circuit elements associated with said rectifier element and mounted on said printed board, said printed board being accommodated in a case to which is attache a foot-board connected with said movable terminal to move the latter.

4. A speed controlling device of a single phase commutator motor, comprising a power source switch ($S_1$), a semiconductor controlled rectifier element (P), a fuse (F) and a single phase commutator motor (M) connected together in series between A.C. power source terminals ($T_1$) and ($T_2$), a speed controlling variable resistor ($VR_1$) of which the characteristic curve of the resistance value rises slowly near the reference point (A) and sharply near the terminal point (H) respectively of a movable terminal (K) thereof, a variable resistor ($VR_2$) correcting the irregularities of the gate characteristic of said semiconductor controlled rectifier element (P), a diode ($D_1$), said variable resistors ($VR_1$ and $VR_2$) and said diode ($D_1$) being connected in series between said A.C. power source terminals ($T_1$ and $T_2$) through said power source switch ($S_1$), a capacitor ($C_1$) connected in parallel with the series connection of said variable resistors ($VR_1$ and $VR_2$), said movable terminal (K) of said variable resistor ($VR_1$) being connected with the gate terminal of said semiconductor controlled rectifier element (P) through a diode ($D_2$), a resistor ($R_2$) for stabilizing the gate characteristic of said semiconductor controlled rectifier element (P) and connected between said gate terminal and the cathode side of said semiconductor controlled rectifier element (P), a short-circuiting switch ($S_2$) interlocking with the movement of the movable terminal (K) of said variable resistor ($VR_1$) and closing when the conduction angle of said semiconductor controlled rectifier element (P) reaches a maximum, said short-circuiting mechanism ($S_2$) being connected between the anode terminal and cathode side of said semiconductor controlled rectifier element (P), an operating knob for a speed change-over switch ($S_3$) manually generating a restraining action which prevents said short-circuiting switch ($S_2$)

from being closed, all of said variable resistors ($VR_1$ and $VR_2$), capacitor ($C_1$), diodes ($D_1$ and $D_2$), power source switch ($S_1$), short-circuiting switch ($S_2$) and fuse (F) being disposed on a printed board (4), the resistance film (8a) and tap (8) of said variable resistor ($VR_1$) being in close contact with the surface of said printed board (4), a brush (10) of said movable terminal (K) of said variable resistor ($VR_1$) being slid on said tap (8), said printed board (4) being mounted within a case (2), said case (2) having a pivotally movable foot-board (1) attached thereto, said foot-board (1) and said movable terminal (K) of said variable resistor ($VR_1$) being connected together through a crank (5) and a connecting plate (11).

References Cited

UNITED STATES PATENTS

| | | | |
|---|---|---|---|
| 2,850,607 | 9/1958 | Bourns et al. | 338—183X |
| 3,364,452 | 1/1968 | Thompson et al. | 338—108 |
| 3,225,232 | 12/1965 | Turley et al. | 318—345X |
| 3,278,821 | 10/1966 | Gutzwiller | 318—345X |
| 3,374,758 | 3/1968 | Mais | 318—345X |
| 3,378,748 | 4/1968 | Bull | 318—345 |

ORIS L. RADER, Primary Examiner

R. J. HICKEY, Assistant Examiner

U.S. Cl. X.R.

338—108